United States Patent
Lemelson et al.

(10) Patent No.: US 6,437,727 B2
(45) Date of Patent: *Aug. 20, 2002

(54) FRIEND OR FOE DETECTION SYSTEM AND METHOD AND EXPERT SYSTEM MILITARY ACTION ADVISORY SYSTEM AND METHOD

(76) Inventors: Jerome H. Lemelson, deceased, late of Incline Village, NV (US); by Dorothy Lemelson, legal representative, Unit 802, Suite 286, 930 Tahoe Blvd., Incline Village, NV (US) 89451; Robert D. Pedersen; Steven R. Pedersen, both of 7808 Gleneagle Dr., Dallas, TX (US) 75248

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/745,264

(22) Filed: Dec. 20, 2000

Related U.S. Application Data

(63) Continuation of application No. 09/558,176, filed on Apr. 26, 2000, now Pat. No. 6,201,495, which is a continuation of application No. 09/231,326, filed on Jan. 13, 1999, now Pat. No. 6,166,679.

(51) Int. Cl.$^7$ .......................... G01S 13/78; G01S 15/74; G06F 9/44
(52) U.S. Cl. ........................................ 342/45; 706/52
(58) Field of Search .............................. 342/45, 357.06, 342/357.17, 357.07, 357.01; 706/52, 900

(56) References Cited

U.S. PATENT DOCUMENTS

| | | | |
|---|---|---|---|
| 3,171,126 A | 2/1965 | Wiley | 343/112 |
| 4,136,340 A | 1/1979 | Bishop | 342/45 |

(List continued on next page.)

*Primary Examiner*—Thomas H. Tarcza
*Assistant Examiner*—Fred H. Mull
(74) *Attorney, Agent, or Firm*—Edwin A. Suominen; Douglas W. Rudy

(57) ABSTRACT

A friend or foe detection system and method is disclosed. Friend or foe warning unit 20 has a geographic locating system, a communication system for communicating with each of the warning units, and a military force detection system for detecting military forces in a combat area and has a signal routing and control circuitry 50 for controlling operations. A number of components, devices, or subsystems, such as a transmitter/receiver radio 28, an antenna 26, a microphone 30, a speaker 32, a battery 34, a display 36, a microprocessor 38, a memory 40, a camera 56, a radar/lidar input 54, on/off switch 52, a GPS location system 45 that includes a GPS processor 46, a GPS receiver 42, a GPS antenna 44, are coupled to the circuitry 50. Display 36 provides a display to the user of the unit 20 and shows the location of friendly forces as well as unfriendly or unidentified forces in the area. Display 36 displays text messages for the user of the warning unit 20. The microprocessor 38 together with memory 40 provide microprocessor control of the operations of the warning unit 20. The geographic locating system includes GPS processor 46, GPS receiver 42, and GPS antenna 44, and it is used to determine the exact location of the warning unit 20. The unit 20 is able to broadcast and receive military force information, such as location and status (i.e. friendly, unfriendly, unidentified statuses). An expert system military action advisory system and method for advising military troops or personnel of firing decisions is also disclosed. A firing index is determined based on the membership variables, and the firing index is used to help make the firing decisions. The membership variables and the firing index are defined for an expert system or fuzzy logic system, and the expert system or fuzzy logic system helps determine making the firing decisions. The system and method operate by transmitting target and friendly force GPS coordinate information to determine danger. Alternatively, only target coordinates are transmitted with fire danger indices calculated on a distributed basis by individual warning units and transmitted to the source of fire without friendly force location coordinates to assist in making final firing decisions.

6 Claims, 7 Drawing Sheets

U.S. PATENT DOCUMENTS

| | | | |
|---|---|---|---|
| 4,232,313 A | 11/1980 | Fleishman | 343/6 R |
| 4,384,293 A | 5/1983 | Deem et al. | 343/113 R |
| 4,741,245 A | 5/1988 | Malone | 89/41.03 |
| 4,814,769 A | 3/1989 | Robin et al. | 342/45 |
| 4,837,575 A | 6/1989 | Conner, Jr. | 342/45 |
| 4,862,176 A | 8/1989 | Voles | 342/45 |
| 4,949,089 A | 8/1990 | Ruszkowski, Jr. | 342/52 |
| 5,131,602 A | 7/1992 | Linick | 244/3.14 |
| 5,187,485 A | 2/1993 | Tsui et al. | 342/357 |
| 5,260,709 A | 11/1993 | Nowakowski | 342/62 |
| 5,280,277 A | 1/1994 | Hombeck | 345/108 |
| 5,280,287 A | 1/1994 | Evans | 342/45 |
| 5,302,956 A | 4/1994 | Ashbury et al. | 342/70 |
| 5,321,401 A | 6/1994 | Kaman et al. | 342/55 |
| 5,323,472 A | 6/1994 | Falk | 382/31 |
| 5,329,595 A | 7/1994 | Davies | 382/17 |
| 5,332,176 A | 7/1994 | Wootton | 244/3.11 |
| 5,335,297 A | 8/1994 | Pullen | 282/50 |
| 5,341,142 A | 8/1994 | Reis et al. | 342/64 |
| 5,341,435 A | 8/1994 | Corbett et al. | 382/1 |
| 5,344,105 A | 9/1994 | Youhanaie | 244/3.14 |
| 5,455,587 A | 10/1995 | Schneider | 342/62 |
| 5,483,865 A | 1/1996 | Brunand | 89/41.21 |
| 5,554,994 A | 9/1996 | Schneider | 342/357 |
| 5,568,152 A | 10/1996 | Janky et al. | 342/357 |
| 5,594,454 A | 1/1997 | Devereaux et al. | 342/357 |
| 5,625,363 A | 4/1997 | Spilker | 342/352 |
| 5,636,245 A | 6/1997 | Ernst et al. | 375/259 |
| 5,638,164 A | 6/1997 | Landau | 356/5.01 |
| 5,644,386 A | 7/1997 | Jenkins et al. | 356/4.01 |
| 5,657,947 A | 8/1997 | Mayersak | 244/3.19 |
| 6,201,495 B1 * | 3/2001 | Lemelson et al. | 342/45 |

* cited by examiner

TARGET PRIORITY = LOW

| FRIEND DISTANCE / ORDINANCE RADIUS | CLOSE | MEDIUM | FAR |
|---|---|---|---|
| SHORT | LOW | MEDIUM | HIGH |
| MEDIUM | LOW | LOW | MEDIUM |
| FAR | LOW | LOW | LOW |

FIG. 7A
96

TARGET PRIORITY = MEDIUM

| FRIEND DISTANCE / ORDINANCE RADIUS | CLOSE | MEDIUM | FAR |
|---|---|---|---|
| SHORT | MEDIUM | HIGH | HIGH |
| MEDIUM | LOW | MEDIUM | HIGH |
| FAR | LOW | LOW | MEDIUM |

FIG. 7B
98

TARGET PRIORITY = HIGH

| FRIEND DISTANCE / ORDINANCE RADIUS | CLOSE | MEDIUM | FAR |
|---|---|---|---|
| SHORT | HIGH | HIGH | HIGH |
| MEDIUM | MEDIUM | HIGH | HIGH |
| FAR | LOW | MEDIUM | HIGH |

FIG. 7C
100

FRIEND OR FOE DETECTION SYSTEM AND METHOD AND EXPERT SYSTEM MILITARY ACTION ADVISORY SYSTEM AND METHOD

CROSS-REFERENCE TO RELATED APPLICATIONS

This application is a continuation of application Ser. No. 09/558,176, filed on Apr. 26, 2000 now U.S. Pat. No. 6,201,495. Both the present application and the '176 application are continuations of application Ser. No. 09/231,326, which was filed on Jan. 13, 1999 and issued, after the filing date of the present application, as U.S. Pat. 6,166,679. All three applications are commonly owned.

FIELD OF INVENTION

These inventions relate to the detection of soldiers, transportation devices or combative devices and determination of friend or foe status of said people or objects, and, more particularly, the detection of said persons or objects and determination of friend or foe status in a combat area.

BACKGROUND OF INVENTION

It is a tragedy when lives are lost in combat. It is even more tragic when soldiers are killed by forces originating from their own army. The present invention attempts to prevent such tragedies from occurring. The invention creates a system of communication for combat troops that enables them to locate and identify friendly forces. The invention also warns troops that they are in a dangerous location because of an imminent military action. The invention makes use of advanced expert system, fuzzy logic, GPS satellite location technology, radar, lidar battle field communication systems.

Several prior art patents address different aspects of friend or foe identification systems. For example, it is known to provide a community of aircraft with a tactical navigation and communication system. See, e.g., U.S. Pat. No. 4,232,313.

It is also known to selectively distribute generally broadcasted information based upon location. See, e.g., U.S. Pat. No. 5,636,245.

It is also known to create a paging or messaging system using GPS satellites. See, e.g., U.S. Pat. No. 5,625,363.

It is also known to create a sighting system for helicopter aircraft. See, e.g., U.S. Pat. No. 5,483,865.

It is also known to analyze images using optical correlation and opto-electronic feedback. See, e.g., U.S. Pat. No. 5,323,472.

It is also known to use a lidar system from an aircraft. See, e.g., U.S. Pat. No. 5,231,401.

It is also known to image a scene having targets via a laser scanner. See, e.g., U.S. Pat. No. 5,638,164.

It is also known to detect a target within a scene using visual radar sensors. See, e.g., U.S. Pat. No. 5,644,386.

It is also known to perform optical signal processing including target recognition and filtering. See, e.g., U.S. Pat. No. 5,329,595.

It is also known to detect and recognize objects by video image means. See e.g., U.S. Pat. No. 5,341,435.

It is also known to detect missiles using a medium wave infrared sensor or TV sensor. See, e.g., U.S. Pat. No. 5,332,176.

It is also known to detect targets using vision systems. See, e.g., U.S. Pat. No. 5,335,297.

It is also known to precisely deliver weapons using synthetic array radar. See, e.g., U.S. Pat. No. 5,260,709.

It is also known to remotely guide cannon-launched projectiles. See, e.g., U.S. Pat. No. 5,131,602.

It is also known precisely guide aircraft-launched bombs via GPS technology. See, e.g., U.S. Pat. No. 5,657,947.

It is also known to create an all weather target detection and ranging system which does not actively transmit detectable radio pulses or waves. See, e.g., U.S. Pat. No. 3,171,126.

It is also known to create a three dimensional millimeter wave tracking and guidance system. See, e.g., U.S. Pat. No. 5,455,587.

It is also known to create an automatic target acquisition and tracking system for a focal plane array seeker. See, e.g., U.S. Pat. No. 5,341,142.

It is also known to guide a vehicle to a target using the global positioning system. See, e.g., U.S. Pat. No. 5,344,105.

It is also known to link global positioning satellites and missile communication systems. See, e.g., U.S. Pat. No. 5,594,454.

It is also known to accurately determine the location of a target by an observer that is spaced apart from the object via the use of a satellite positioning system. See, e.g., U.S. Pat. Nos. 5,568,152; 4,949,089.

It is also known to create a self-surveying relative GPS weapon guidance system. See, e.g., U.S. Pat. No. 5,554,994.

It is also known to aim artillery with GPS navstar. See, e.g., U.S. Pat. No. 4,741,245.

It is also known to create a passive ranging system through a global positioning system. See, e.g., U.S. Pat. No. 5,187,485.

It is also known to precisely target and deliver guided weapons by determining the GPS locations of aircraft and targets. See, e.g., European Patent No. 0 583 972 A1.

It is also known to create an apparatus and method for providing pointing information. See, e.g., U.S. Pat. No. 4,384,293.

All of the above mentioned patents are incorporated by reference herein. However, none of the above mentioned patents disclose a system and method for detecting the friend or foe status of a military force. On the other hand, some systems and methods for detecting friend or foe status of a military force do exist in the prior art.

For example, it is also known to identify military forces as a friend or foe. See, e.g., U.S. Pat. No. 5,280,287. U.S. Pat. No. 5,280,287 does not, however, use GPS technology to accurately locate and determine friend or foe status. Furthermore, it is also known to determine friend or foe status of military forces using lasers and coded words. See, e.g., U.S. Pat. Nos. 4,814,769 and 4,837,575. However, neither of these patents uses GPS technology to accurately locate and determine friend or foe status of military forces. Additionally, it is also known to determine friend or foe status of military forces by using identification codes that are transmitted between an interrogator and responder. See, e.g., U.S. Pat. No. 4,862,176. U.S. Pat. No. 4,862,176 also does not, however, use GPS technology to accurately locate and determine friend or foe status of military forces. U.S. Pat. Nos. 5,280,287, 4,814,769, 4,837,575, 4,862,176 are incorporated by reference herein.

None of the prior art approaches use GPS technology to accurately locate and determine friend or foe status of military forces. Furthermore, none of the prior art approaches use expert systems or fuzzy logic to provide recommendations for execution of military actions. Also, none of the prior art approaches disclose or teach a combination system and method for determining friend or foe status of military forces and recommending execution of military actions. Importantly, none of these prior art approaches to teach a system or method for identifying the presence of friendly forces that may be harmed by firing without disclosing the exact location of those friendly forces.

SUMMARY OF INVENTION

Making firing decision in combat is a difficult process. Emotions such as considerable fear, anger, sense of urgency, panic, etc. may intervene and result in mistakes of judgement. Yet, decisions must be made, and often quickly. Many times the circumstances presented to the decision maker are complex without clear-cut answers to difficult scenarios. Frequently, it would be helpful to decision makers to have some automatic assessment of the situation prior to making final decisions to fire. In its most useful form, that assistance will not be advice to fire or not to fire. Indeed, such advice may tend to remove the all important rationale provided by the people actually involved who can assess many factors that a purely automatic system would not necessarily take into account.

It is therefore an object of this invention to create a system and method for locating and identifying friendly forces in a combat area.

It is a further object of this invention to warn friendly troops in specific geographic locations that they may be in danger due to imminent military action.

It is a further object of the invention to use GPS technology to determine the exact location of armed forces on the earth.

It is a further object of the invention to transmit GPS information between armed forces via short-wave radio.

It is a further object of the invention to transmit friendly force information between armed forces via short-wave radio.

It is a further object of the invention to detect surrounding armed forces via camera, radar, and lidar technology.

It is a further object of the invention to use expert systems to advise troops when making combat decisions.

It is another object of the invention to use fuzzy logic expert systems to advise troops when making combat decisions.

It is a further object of the invention for the short-wave radio, GPS receiver and display to be contained in a compact, hand-held device.

It is a further object of the invention to identify friendly forces in an area to be subjected to aggressive force without broadcasting the exact location of the friendly forces.

Further objects of the invention are apparent from reviewing the summary of the invention, detailed description, and claims set forth below.

The above objects and advantages of the invention are achieved by using expert systems or fuzzy logic to calculate a fire decision index at each warning unit. The fire decision index is then transmitted to the source of fire without disclosing the location of friendly forces. The source then decides whether or not to fire. The invention allows operation without disclosing the exact location of the friendly forces. All forces do not have to transmit their individual GPS coordinates.

The above objects and advantages of the invention are achieved by a system for locating military forces and detecting friend or foe status of the military forces that includes warning units each having a geographic locating system, a communication system for communicating with each of the warning units, and a military force detection system for detecting military forces in a combat area. The military force detection system determines status of the military forces. The geographic locating system calculates geographic location position, and the communication system transmits at least the geographic location position and the status to each of the other warning units. Each of the warning units receives the geographic location position and the status from each of the other warning units and displays locations of the military forces and indicates the military forces with the status. Each of the warning units further have signal routing and control circuitry for controlling operations of each of the warning units. A microprocessor and a memory device are coupled to the signal routing and control circuitry to provide computer control and operation for each of the warning units. Also, a radio transmitter and receiver, a speaker, and a microphone are coupled to the signal routing and control circuitry, and a communications antenna is coupled to the radio transmitter and receiver. The communication system transmits and receives warning unit information.

A display is further coupled to the signal routing and control circuitry to show location of the military forces, user information, text messages, status of the military forces. The display further has a grid with latitudinal and longitudinal lines. The grid is divided into various location sectors, and the location and the status of the military forces may be shown on the grid. The status of the military forces may be friendly, unfriendly, or unidentified. A camera or radar/lidar is/are coupled to the signal routing and control circuitry for providing visual information relating to the combat area. A power source or battery is coupled to the signal routing and control circuitry for providing power to each of the warning units. A switch is coupled to the signal routing and control circuitry for activating and deactivating each of the warning units.

The geographic locating system is a global positioning system locating device coupled to the signal routing and control circuitry. The global positioning system locating device further has a global positioning system processor, a global positioning system receiver coupled to the global positioning system processor, and a global positioning system antenna coupled to the global positioning system processor. The global positioning system locating device calculates the geographic location position and determines warning unit location. An advisory system for advising military troops or personnel of firing decisions is made part of each of the warning units. The advisory system defines membership variables affecting the firing decisions. The advisory system also determines a firing index based on the membership variables and uses the firing index to assist in making firing decisions. The advisory system may be an expert system or fuzzy logic system.

The above objects and advantages of the invention are further achieved by a method for implementing and operating warning units to locate military forces and to detect friend or foe status of the military forces. Geographic location of each of the warning units is determined by calculating geographic coordinates. The geographic location is broadcast to each of the other warning units. The status of the military forces is broadcast to each of the other warning units. Transmitted information is received from each of the other warning units, and the combat area is scanned to obtain military forces location and status information. The geographic location, the transmitted information, and the military forces location and status information are processed in order to display the location and status of the military forces. The location and status of the military forces are displayed on a display of each of the warning units.

The above objects and advantages of the invention are also achieved by a method for implementing and operating warning units to locate military forces and to detect friend or foe status of the military forces. The method determines whether a user of one of the warning units is about to execute an aggressive military action. Geographic location coordinates of at least one anticipated enemy target are calculated if the user is about to execute the aggressive military action. Warning information relating to the aggressive military action is transmitted from one of the warning units to each of the other warning units to warn the friendly military forces that are in the vicinity of the at least one anticipated target. The one warning unit waits a predetermined time for response information to be sent from each of the other warning units. Response information may indicate that friendly forces are in an area to be fired upon without disclosing the exact location of those friendly forces. The method determines whether the one warning unit has received response information from each of the other warning units.

The aggressive military action is executed if no response information was received by the one warning unit. Expert analysis is performed in determining whether the aggressive military action should be executed if the response information was received by the one warning unit. The aggressive military action is aborted if the expert analysis results in determining abortion of the aggressive military action. The aggressive military action, on the other hand, may be executed depending on the results of the expert analysis. The method determines if each of the other warning units is transmitting other warning information to the one warning unit when the user of the one warning unit is not about to execute an aggressive military action. The method determines whether the user of the one warning unit is in danger based on the determined geographic location coordinates if other warning information has been received by the one warning unit. The user is warned of any danger if other warning information has been received, and the user is advised of a route to safety.

The above objects and advantages of the invention are further achieved by an expert system or fuzzy logic calculation method for advising military troops or personnel of firing decisions. Membership variables affecting the firing decisions are defined. A firing index is determined based on the membership variables, and the firing index is used to help make the firing decisions. The membership variables and the firing index are defined for an expert system or fuzzy logic system, and the expert system or fuzzy logic system assists in determining the firing decisions. The membership variables may be a target priority membership variable (low, medium, high), a friend distance-to-target membership variable (close, medium, far), an ordinance radius membership variable (short, medium, far). The firing index may be defined as a low firing index, a medium firing index, or a high firing index.

The above objects and advantages of the invention are further achieved by a method of transmitting warning signals to all units in an area to be fired upon. The transmitted message includes the GPS coordinates of the target. All warning units in the area of the target receive the warning message, and each unit calculates a fire decision index corresponding to its location, the coordinates of the target, the priority of the target and the radius of destruction of the ordinance. These calculations are made on a distributed basis by individual warning units. The fire decision index is then transmitted to the originator of the warning message without disclosing the location of friendly forces. Having received the fire decision indices from friendly forces, the originating units decide whether or not to commence firing.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

For example, the disclosed system and method makes use of GPS communication satellites and GPS receivers to determine locations throughout the system. Other navigation or location tracking systems could likewise be used. Thus, GPS technology is shown and referenced generally throughout this disclosure, and unless specifically noted, is intended to represent any and all devices/technologies appropriate to determine locations.

Likewise, there are disclosed several computers or controllers that perform various control operations. The specific form of computer is not important to the invention. In its preferred form, applicant divides the computing and analysis operations into several cooperating computers or microprocessors. However, with appropriate programming well known to those of ordinary skill in the art, the inventions can be implemented using a single, high power computer. Thus, it is not applicant's intention to limit his invention to any particular form of computer.

Applicant recognizes that many of the disclosed communications described herein will be encrypted while in a military setting. However, it is not applicants intention to disclose military secret code. All communications described herein are designed to be used in conjunction with any type of encryption practice.

Also, the use of transmitter/receivers, antennas, microphone, speaker, camera, radar/lidar, display have also been disclosed in this specification. However, the present invention is not in any way limited to being used with these specific components, devices, or apparatuses, and any and all suitable components, devices, or apparatuses that provide or perform the respective or corresponding operation may be used in conjunction with the present invention.

Further examples exist throughout the disclosure, and it is not applicant's intention to exclude from the scope of his invention the use of structures, materials, or acts that are not expressly identified in the specification, but nonetheless are capable of performing a claimed function.

BRIEF DESCRIPTION OF THE DRAWINGS

FIG. 7A is a chart for the fuzzy logic decision rules that determine the fire decision index when the target priority is low.

FIG. 7B is a chart for the fuzzy logic decision rules that determine the fire decision index when the target priority is medium.

FIG. 7C is a chart for the fuzzy logic decision rules that determine the fire decision index when the target priority is high.

DETAILED DESCRIPTION OF THE DRAWINGS

Figure 1:
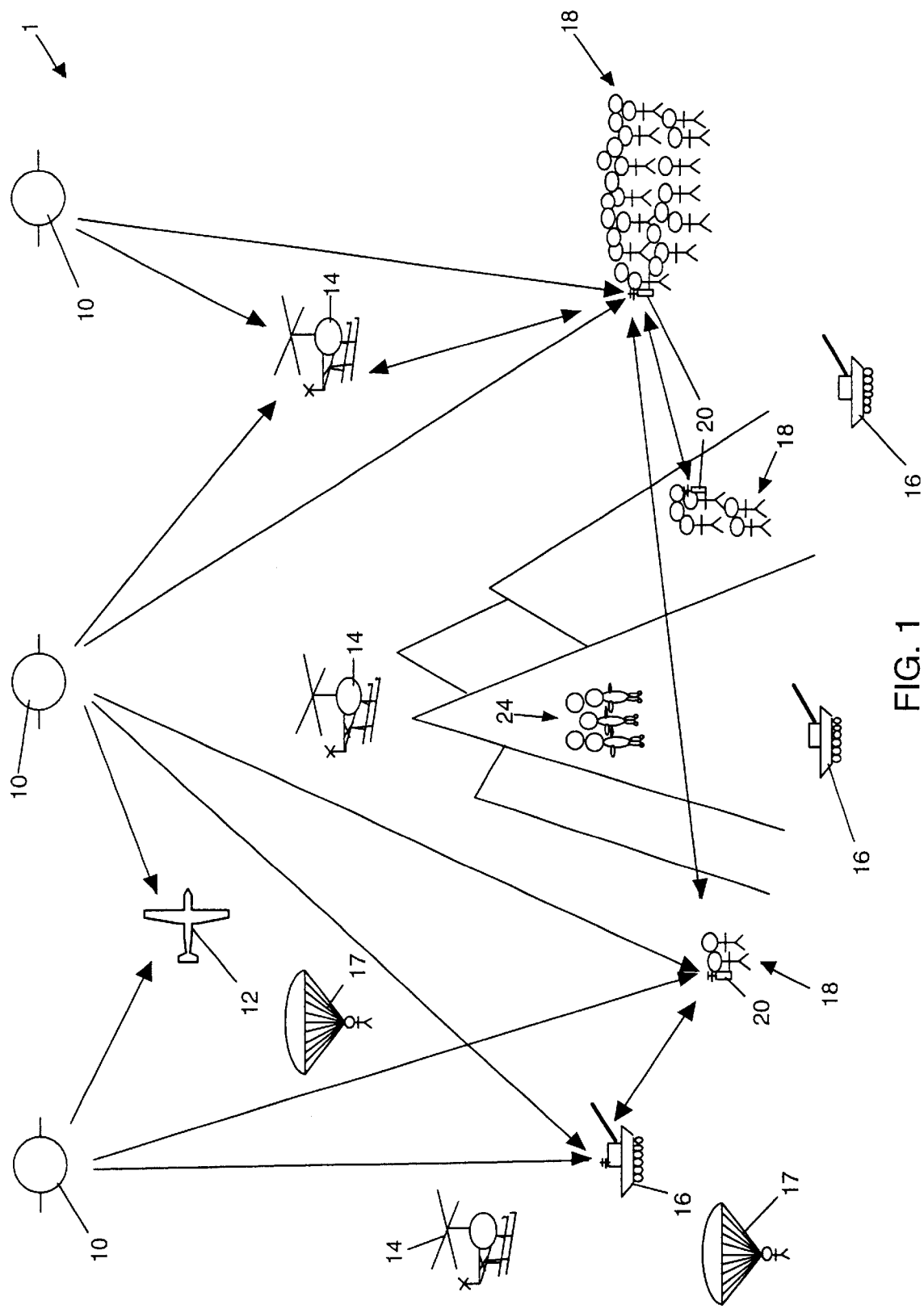
FIG. 1 is an illustration of the present friend or foe detection system and method used in a combat zone.

FIG. 1 depicts an overall combat situation 1. The present invention involves systems and methods for detecting persons or objects and determining whether those persons or objects are of friend or foe status in a combat area. FIG. 1 shows friend or foe warning units 20 of the present invention that are located in airplanes 12, helicopters 14 and land vehicles 16. The warning units 20 are also carried by land based troops 18 and air-to-ground paratroopers 17. Global positioning satellites (GPS) satellites 10 are used to determine the exact location of the friend or foe warning units 20. The combat situation 1 illustrated in FIG. 1 depicts a friendly army of armed forces surrounding unfriendly forces 24. The friendly army uses the friend or foe detection system and method to detect their foe forces and to further detect and aid in the prevention of attacking their own troops (i.e. their own friendly forces).

Figure 2:
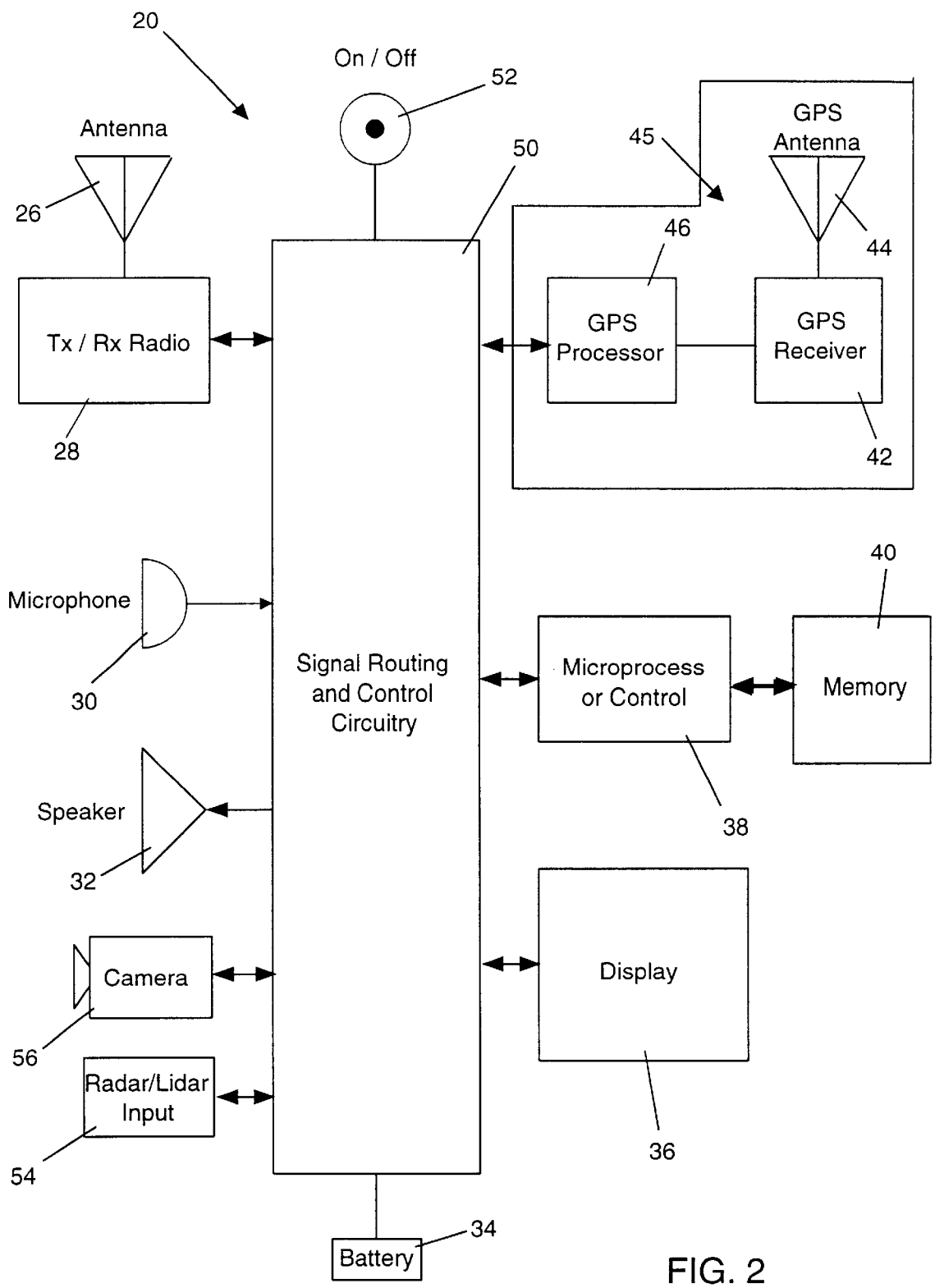
FIG. 2 is a block diagram of the present invention friend or foe detection warning unit.

FIG. 2 depicts a block diagram of the friend or foe warning unit 20. The friend or foe warning unit 20 comprises a combination of modern communication technology and precise geographic location capability derived from GPS satellites, which are all implemented with advanced low cost compact electronics. The unit 20 generally has a signal routing and control circuitry 50 for controlling operations of the unit 20. A number of components, devices, or subsystems, such as a transmitter/receiver radio 28, an antenna 26, a microphone 30, a speaker 32, a battery 34, a display 36, a microprocessor 38, a memory 40, a camera 56, a radar/lidar input 54, on/off switch 52, a GPS location system 45 that includes a GPS processor 46, a GPS receiver 42, a GPS antenna 44, are coupled to the circuitry 50.

The unit 20 is controlled and activated/deactivated by the on/off switch 52. The warning unit 20 transmits and receives information via the transmit/receive (TX/RX) radio 28 and antenna 26. The microphone 30 allows the user to communicate speech messages to other users of the friend or foe detection system and method. The speaker 32 enables the user(s) of the warning unit 20 to hear audible messages therefrom. The camera input 56 is used to provide visual information about the observed combat zone. The radar/lidar input 54 is also used to provide visual information about the observed combat zone. Camera 56 and/or radar/lidar 54 may be made integral with the unit 20 or may be detachable and attached via cable or via other such communication facilities. The warning unit 20 is powered by battery 34. Warning units 20 may also be powered by other power sources such as batteries, conventional AC power sources, or other such sources. The display 36 provides a display to the user of the unit 20, showing the location of friendly forces as well as unfriendly or unidentified forces in the area. In addition, the display 36 is capable of displaying text messages for the user of the warning unit 20. Text messages are especially useful for users of the warning unit 20 when silence must be observed in a combat zone. The microprocessor 38 together with memory 40 provide control of the operations of the warning unit 20. The GPS processor 46, GPS receiver 42, and GPS antenna 44 are used to determine the exact location of the warning unit 20 on the earth. All of the components of the warning unit 20 are coupled to the signal routing and control circuitry 50.

Figure 3:
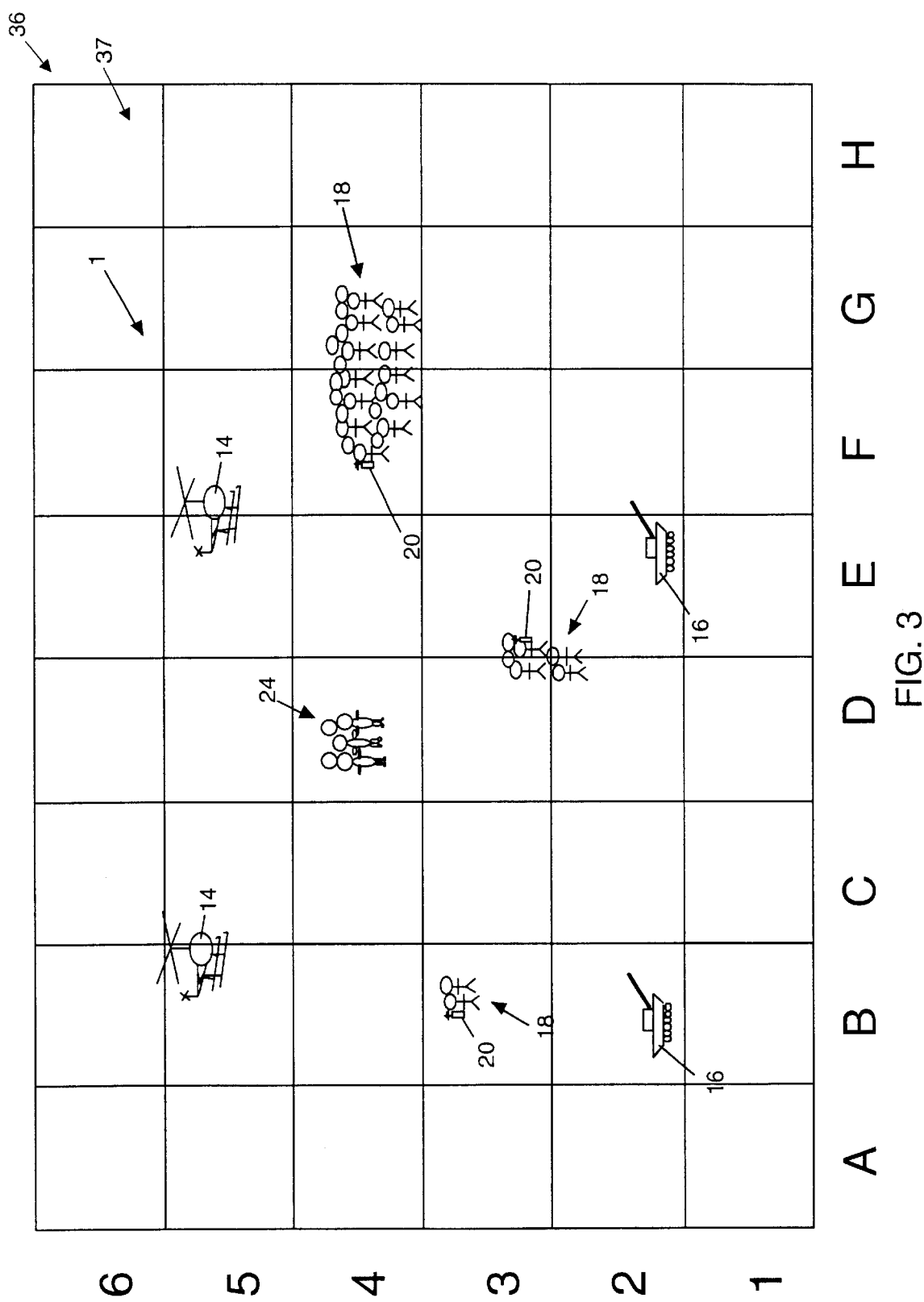
FIG. 3 is an front view of the visual display of the friend or foe detection warning unit.

FIG. 3 depicts the display 36 of the warning unit 20. The display 36 in FIG. 3 shows the combat situation 1 on grid screen 37 wherein a friendly army of helicopters 14, troops 18, and tanks 16 are surrounding unfriendly forces 24. The display 36 shows the information on the grid screen 37 that is representative of the latitude and longitude lines that are used by the GPS location system 45. The users of the warning units 20 survey the combat zone of combat situation 1 and compare their observations to the display 36 of the warning unit 20. FIG. 3 shows that the troops 24 located in sector D4 are unfriendly troops and that all other forces have been determined to be friendly forces. Thus, the tank 16 located in sector B2 knows not to fire upon troops 18 located in sector B3. Likewise, all other friendly forces know not to fire upon forces which are detected to be friendly forces. However, all friendly forces know that the troops located in sector D4 are unfriendly and that it is permissible to take aggressive action upon the unfriendly troops located in sector D4.

Figure 4:
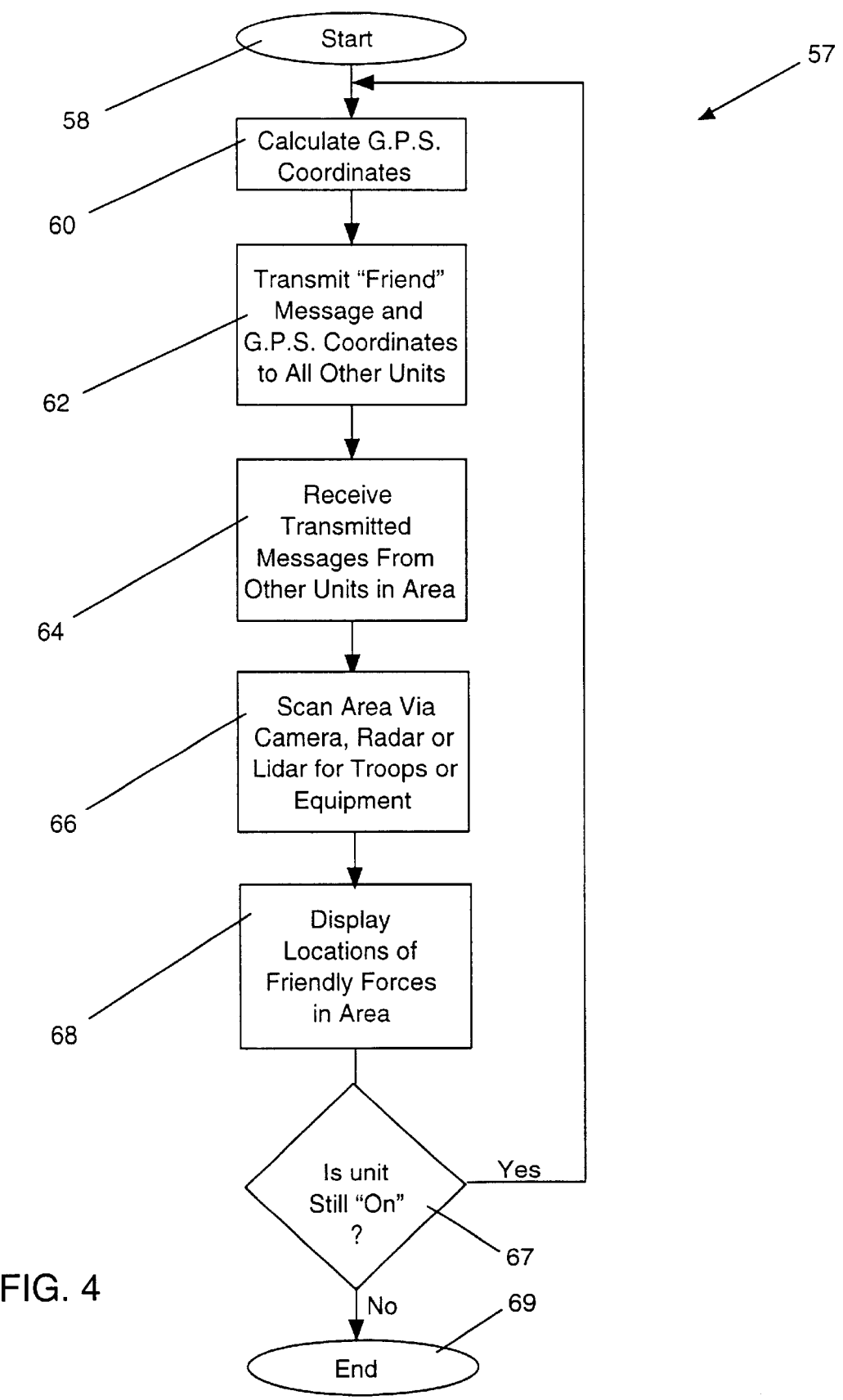
FIG. 4 is a flow chart diagram of one preferred embodiment algorithm for implementation of the operation of the friend or foe detection warning unit.

FIG. 4 shows an algorithm 57 in flow chart form for implementation and operation of the warning unit 20. The flow chart algorithm 57 begins at start block 58. The warning unit 20 determines its location by calculating its GPS coordinates at block 60. The warning unit 20 next broadcasts a message to all other warning units 20 in the area that informs other troops of the troop's location associated with the broadcasting warning unit 20 and further informs that the troop is a friendly force at block 62. At block 64, the warning unit 20 receives transmitted messages from other units 20 in the area. At block 66, the warning unit 20 scans the combat area via cameras, radar, or lidar for other troops or military equipment. The warning unit 20 processes all the data collected at blocks 64 and 66 and determines friend or foe status for all detected military forces in said area. At block 68, the warning unit 20 displays the location of military forces and determined friend or foe status for all military forces in the combat area, and any text messages for the users of the warning unit 20. At decision block 67, the algorithm 57 determines whether the unit 20 is still "on" or activated. If the unit is still "on" or activated, then the logic flow chart algorithm 57 then returns to block 60 to calculate updated or current GPS coordinates. If the unit 20 is no longer "on" or activated, the algorithm 57 ends at block 69.

If a military force or troop is confident that their radio communications are most likely not able to be decoded by enemy forces, the above operation of the invention may be used. However, if there is concern or fear of the enemy decoding communications between friendly forces, applicant also discloses in FIG. 5 an alternative operation of the present invention. This alternative operation does not divulge the location of any military forces.

Figure 5:
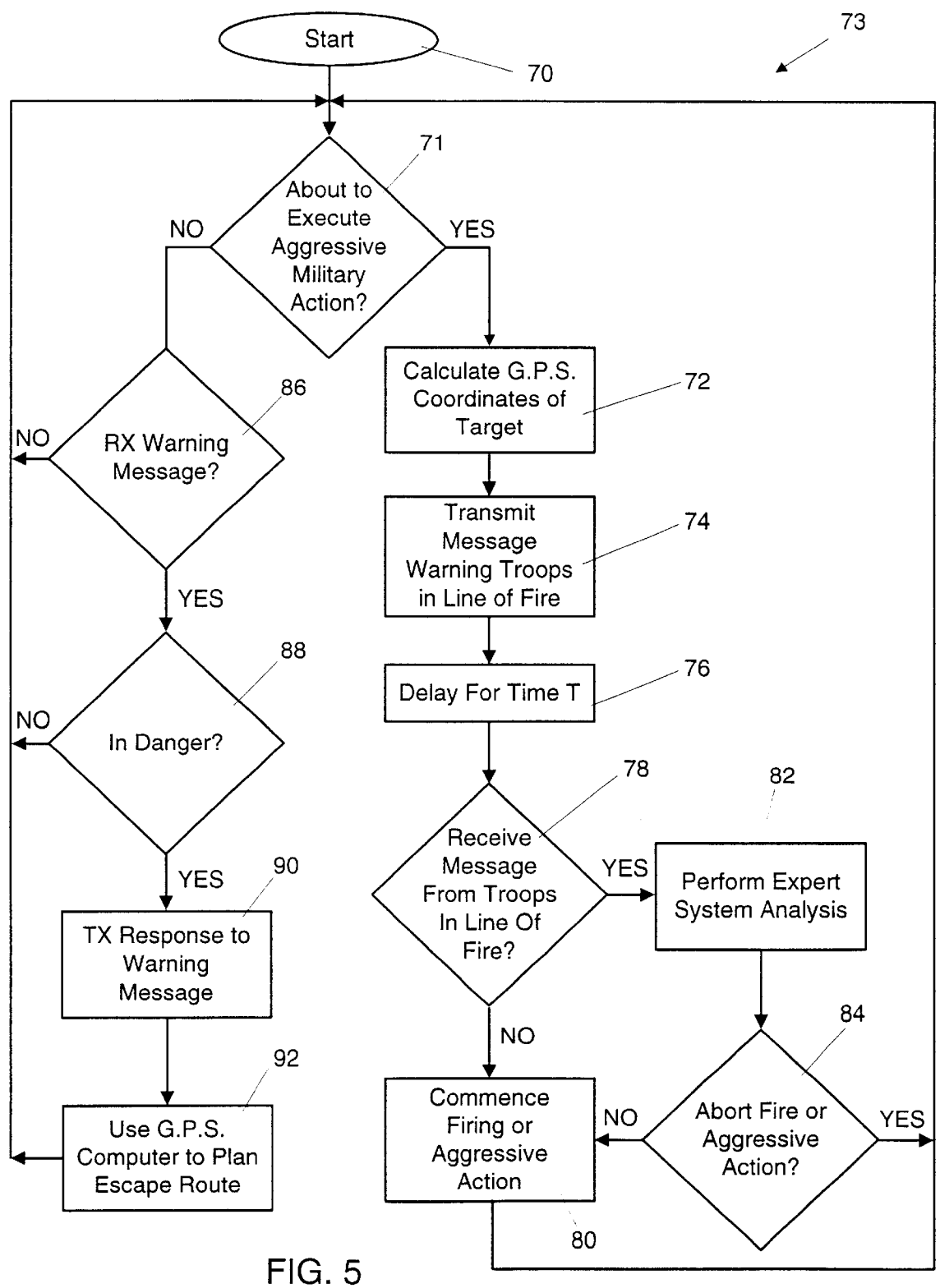
FIG. 5 is a flow chart diagram of another preferred embodiment algorithm for implementation of the operation of the friend or foe detection warning unit.

FIG. 5 is a logic flow chart algorithm 73 for operation of the warning unit 20 that does not require broadcasting of exact friendly force location information. The logic flow chart algorithm begins at start block 70. The algorithm 73 determines at decision block 71 if the user of the warning unit 20 is about to execute an aggressive military action (i.e. gun fire, launch missile, etc). If the user is about to execute an aggressive military action, the warning unit 20 calculates the GPS coordinates of the anticipated enemy target that is about to fired upon, bombed, or attacked at block 72. The warning unit 20 then transmits at block 74 a message to warn all friendly troops in vicinity of the anticipated enemy target that they may be in the line of fire or some other type of danger that would be a result of the imminent military action. The transmitted message may include the GPS coordinates of the target or coordinates defining an area of danger. At block 76, the warning unit 20 waits a predetermined time T for response messages from friendly forces that may be in danger due to the imminent military action. The decision time T is selected to be long enough to receive messages from friendly forces, but short enough to preclude enemy escape if the message is intercepted. The algorithm 73 determines at decision block 78 if the warning unit 20 received any response messages from friendly forces. If no response messages are received from friendly forces, the anticipated aggressive military action or commencement of firing is executed at block 80. If a response message from friendly forces is received, expert system analysis is performed at block 82. At block 84, the algorithm 73 determines if the imminent military action or firing should be aborted due to the presence of friendly forces in the target area. If the military action is not aborted, the action is executed at block 80, and, after the action or firing is executed, control of warning unit 20 by algorithm 73 is returned to block 71. If the imminent military action or firing is aborted at decision block 84, then control of warning unit 20 by algorithm 73 returns to block 71.

On the other hand, if the algorithm 73 determines at block 71 that the user of the warning unit 20 is not about to execute an aggressive military action or firing, the warning unit 20 determines if any other warning units 20 are transmitting warning messages indicating that they are about to execute military actions or firings at block 86. If no warning messages are detected, control of the unit 20 by algorithm 73 is sent back to block 71. If a warning message from another warning unit 20 is received, the algorithm 73 determines at block 88 if the troop(s) associated with the present receiving warning unit 20 is/are in danger based upon their geographic location. If the troop(s) is/are not in danger, control of unit 20 by algorithm 73 is sent back to decision block 71. If it is determined that the troop(s) is/are in danger, the warning unit 20 transmits a response to alert the warning unit 20 of the aggressing troop(s) that they will be in danger if the said military action or firing is executed at block 90, and the warning unit 20 uses GPS technology and mapping systems to plan the most efficient escape route or route to safety for the troop(s) that is/are in danger at block 92.

The present invention further includes a system and method for advising military troops or personnel of firing decisions. The herein disclosed system of advising firing decisions is based on the generation of indices indicating the target priority. The factors involved in making such computations are many and complex requiring a structured and logical approach in organizing large amounts of data and information. From that information, the present invention generates indices indicative of actual target priority levels in different areas based upon multiple inputs. Problems of this type generally benefit from the use of expert system technology with preprogrammed decision rules based upon expert experience reflecting proper response to various situations. Various such expert system methodologies exist and are used in the friend or foe detection systems and methods herein disclosed. Indeed, it is the intent that the invention herein described not be limited to any particular data analysis and organization methods. However, a particularly attractive method and one which demonstrates the interrelationship of the various variables and the logical operations necessary to generate the desired indices and corresponding firing advice is that of fuzzy logic processes. The complexities and range of options in the friend or foe detection system herein described makes fuzzy logic applications an ideal methodology to optimize the firing decision process according to properly weighted parameters.

Decisions are made based on received messages from source of fire and calculated GPS coordinates of warning unit 20. Transmitted source of fire information includes coordinates of target, priority of target, and radius of destruction of ordinance to be used. Warning units 20 calculate a fire index decision based on the received message and GPS coordinates of the warning unit 20. Warning units 20 transmit the fire index decisions to the source of fire. This procedure avoids transmitting GPS coordinates of friendly forces to possible foes or enemy forces. Calculations are made on a distributed basis using the portable warning unit 20 with internal GPS receivers and computers, and only decisions are thereby transmitted.

The fuzzy logic controllers execute fuzzy logic inference rules from a fuzzy rule base. Input and output variables are defined as members of fuzzy sets with degrees of membership in the respective fuzzy sets determined by specified membership functions. The rule base defines the fuzzy inference system and is based on expert knowledge for system control based on observed values of the control variables. The input data defines the membership functions used in the fuzzy rules. The reasoning mechanism executes the fuzzy inference rules, converting the input data to output control values using the data base membership functions.

Figure 6A:
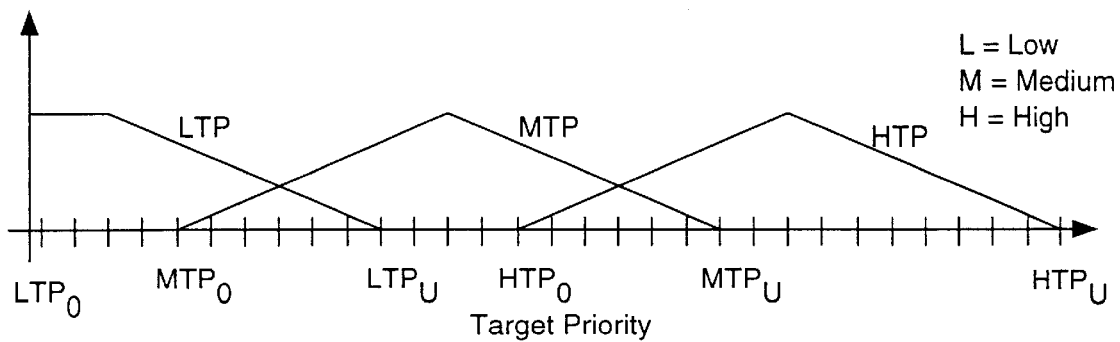
FIG. 6A is a diagram graph illustrating the fuzzy logic target priority membership.
Figure 6B:
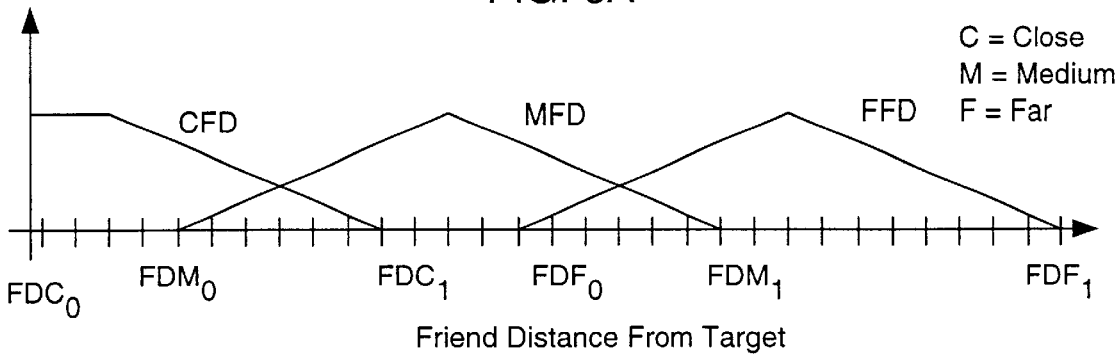
FIG. 6B is a diagram graph illustrating the fuzzy logic friend distance from target membership.
Figure 6C:
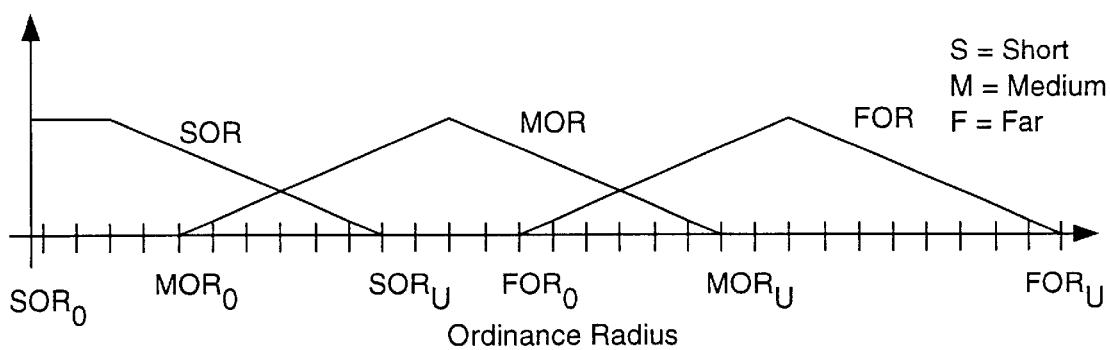
FIG. 6C is a diagram graph illustrating the fuzzy logic target priority ordinance radius membership.

FIGS. 6A–6D are diagrams of graphs illustrating the fuzzy logic memberships used to calculate the firing decision index. FIG. 6A depicts the fuzzy memberships for Target Priority. FIG. 6B depicts the fuzzy memberships for the distance friendly forces are located from a target. FIG.

Figure 6D:
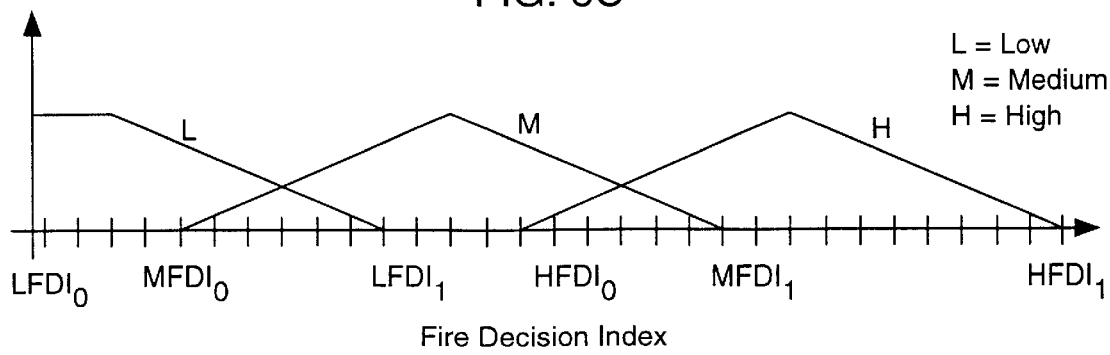
FIG. 6D is a diagram graph illustrating the fuzzy logic target priority fire decision index membership.

6C depicts the fuzzy memberships for the ordinance radius. FIG. 6D depicts the fuzzy memberships for the fire decision index.

To better understand the fuzzy logic compositional rules applied to the fuzzy friend or foe detection system and method herein disclosed, the Target Priority variable is first just considered as shown in FIG. 6A. The fuzzy set corresponding to "Low Target Priority" (LTP) is the set of all target priorities between zero and an upper defined Low Target Priority distance $LTP_u$. Similarly, the fuzzy set corresponding to "Medium Target Priority" (MTP) is the set of all target priorities between the lowest defined Medium Target Priority $MTP_0$ and the upper defined Medium Target Priority distance $MTP_u$. Furthermore, the fuzzy set corresponding to "High Target Priority" (HTP) is the set of all target priorities between the lowest defined High Target Priority $HTP_0$ and the upper defined High Target Priority distance $HTP_u$. Since the "Low" and "Medium" are defined in terms of fuzzy logic variables, it will be true that $MTP_0 < LTP_u$, and the fuzzy sets will overlap. Likewise, the "Medium" and "High" are defined in terms of fuzzy logic variables, it will be true that $HTP_0 < MTP_u$, and the fuzzy sets will overlap. Similarly, overlap occurs between the other defined ranges. The nature of the overlapping membership functions for several of the variables (i.e. Target Priority, Friend Distance From Target, Ordinance Radius, Fire Decision Index) involved in the disclosed friend or foe detection system and method is illustrated in FIGS. 6A–6D. Similar relationships would exist for other variables not shown.

FIGS. 7A–7C provides the fuzzy logic decision rules that determine the fire decision index for a certain set of conditions that the friend or foe detection system and method encounters. The highlighted example 96 in FIG. 7A shows that when a LOW Target Priority, a FAR friend distance, and a FAR ordinance radius occurs, then a LOW fire decision index is assigned. The highlighted example 98 in FIG. 7B shows that when a MEDIUM target priority, MEDIUM friend distance, and MEDIUM ordinance radius, then a MEDIUM fire decision index is assigned. The highlighted example 100 in FIG. 7C shows that when a HIGH target priority, FAR friend distance, and FAR ordinance radius, then a HIGH fire decision index is assigned.

More particularly, the membership functions of FIGS. 6A to 6D illustrate three possible membership classifications (i.e. low, medium, high) for each variable. These respective memberships overlap as indicated in FIGS. 6A to 6D in accordance with the principles of fuzzy logic. In other words, a particular level of target priority may not necessarily be considered just low or just medium but may instead overlap with the indicated varying degree of membership in the low and medium memberships. In this case, more than one fuzzy logic rule from the appropriate tables of FIGS. 7A to 7C will be applied and used. Indeed, with three fuzzy variables for target priority, distance of friendly force from target, and ordinance radius and with each variable having membership in two overlapping regions as shown in FIGS. 6A to 6D, a total of eight ($2^3=8$) separate rules of FIGS. 7A to 7C may be provided for a single set of variable inputs. Using the degrees of membership in each of the respective categories for each of the variables, the fire decision index may be determined using appropriate well known defuzzification rules such as the centroid method. The result will be a specific fire decision index, and the firing decision index is used by the present invention or warning unit 20 to determine whether the user should be advised to execute action/fire or not to execute action/fire.

The inventions set forth above are subject to many modifications and changes without departing from the spirit, scope or essential characteristics thereof. Thus, the embodiments explained above should be considered in all respect as being illustrative rather than restrictive of the scope of the inventions as defined in the appended claims. For example, the present invention is not limited to the specific embodiments, apparatuses and methods disclosed for locating the military troop(s) or for communicating among troop(s). The present invention is also not limited to the use of GPS communication satellites and GPS receivers to determine locations throughout the system. The present invention is also not limited to any particular form of computer or computer algorithm. Furthermore, the present invention is not limited to the transmitter/receivers, antennas, microphone, speaker, camera, radar/lidar, display disclosed in this specification.

We claim:

1. A method for assisting military troops or personnel in making firing decisions based on friend or foe troop identification, comprising:
   (a) defining friendly force and target variables with membership functions affecting the firing decisions,
   (b) determining a firing index based on the variable membership functions, and
   (c) using the firing index to help make the firing decisions.

2. The method according to claim 1 wherein the variables and the firing index are defined for an expert system wherein the expert system helps determine making the firing decisions.

3. The method according to claim 1 wherein one of the variable membership operations defines target priority membership.

4. The method according to claim 1 wherein one of the variable membership operations defines a friend distance-to-target membership.

5. The method according to claim 1 wherein one of the variable membership operations defines ordinance radius membership.

6. A system for assisting military troops or personnel in making firing decisions based on friend or foe troop identification, the system comprising:
   (a) means for defining friendly force and target variables with membership functions affecting the firing decisions;
   (b) means for determining a firing index based on the variable membership functions; and
   (c) means for using the firing index to help make the firing decisions.

* * * * *